July 14, 1936.  B. J. POLLARD  2,047,648
BUILDING STRUCTURE
Filed April 1, 1932
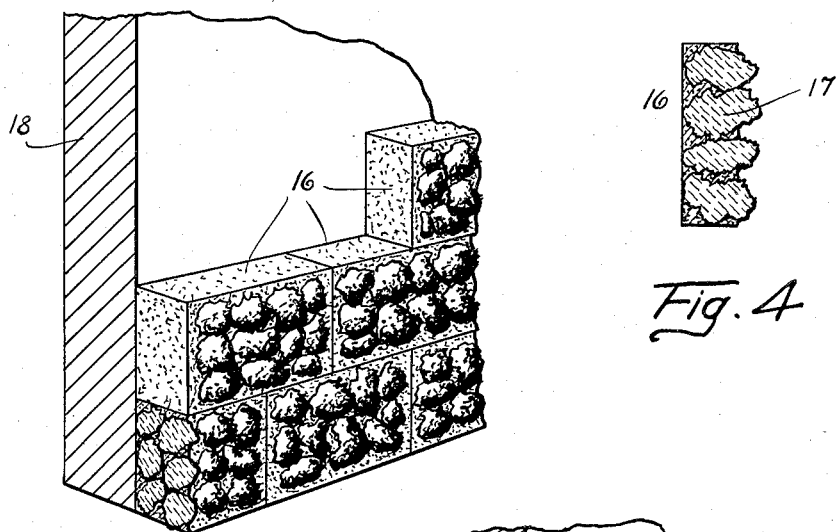
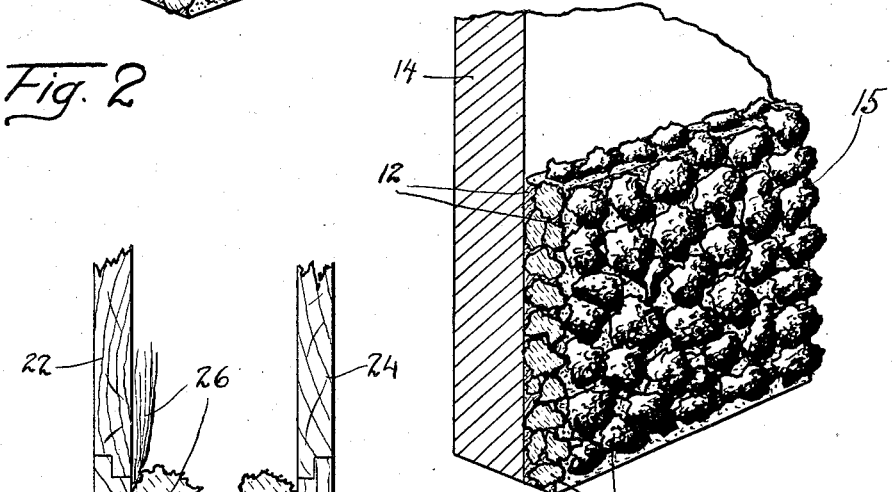
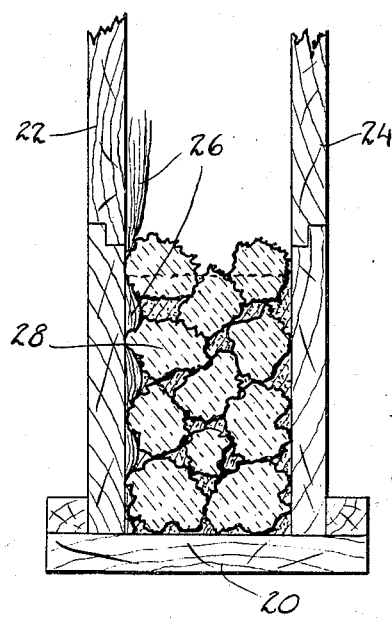
INVENTOR.
Bernard J. Pollard
BY
ATTORNEYS.

7. As a composition of matter, a dyestuff paste comprising a vat dyestuff, a dispersing agent, and a di-(hydroxyalkyl) mono-ether.

8. As a composition of matter, a dyestuff paste comprising a vat dyestuff, a dispersing agent, and diethylene glycol.

9. As a composition of matter, a dyestuff paste comprising an indanthrone dyestuff and diethylene glycol.

10. As a composition of matter, a dyestuff paste comprising an indanthrone dyestuff and hydroxyalkyl ether.

11. A process for the production of a dyestuff paste which comprises replacing a major part of the water in a vat dyestuff paste by a hydroxyalkyl ether.

12. As a composition of matter, a dyestuff paste comprising a vat dyestuff and a di-(hydroxyalkyl)-mono-ether.

13. As a composition of matter, a dyestuff paste comprising an anthraquinone vat dyestuff and a di-(hydroxyalkyl)-mono-ether.

14. A composition of matter consisting of a suspension of an anthraquinone vat dyestuff in a mixture of diethylene glycol and water.

15. A dyestuff paste comprising an anthraquinone vat dyestuff and a hydroxyalkyl ether.

CHARLES J. SALA.